INVENTOR
BENNIE L. GALLIEN,
John R. Manning
ATTORNEY

Feb. 21, 1967 B. L. GALLIEN 3,305,833

CIRCUIT FOR INDICATING READABLE, UNREADABLE OR MISSING CHARACTERS

Filed June 28, 1963 5 Sheets-Sheet 3

Feb. 21, 1967 B. L. GALLIEN 3,305,833

CIRCUIT FOR INDICATING READABLE, UNREADABLE OR MISSING CHARACTERS

Filed June 28, 1963 5 Sheets-Sheet 4

Feb. 21, 1967 B. L. GALLIEN 3,305,833

CIRCUIT FOR INDICATING READABLE, UNREADABLE OR MISSING CHARACTERS

Filed June 28, 1963 5 Sheets-Sheet 5

United States Patent Office
3,305,833
Patented Feb. 21, 1967

3,305,833

CIRCUIT FOR INDICATING READABLE, UNREADABLE OR MISSING CHARACTERS

Bennie L. Gallien, Hurst, Tex., assignor to Sperry Rand Corporation, New York, N.Y., a corporation of Delaware Filed June 28, 1963, Ser. No. 291,423
17 Claims. (Cl. 340—146.3)

This invention relates to a character indicating circuit and more specifically to a circuit for indicating the type of character which has been read (e.g. an unreadable character or a valid character) or that a missing character has been encountered in the reading process.

Character reading systems are employed in many applications for the purpose of increasing the speed of handling business documents by reducing the manual operations heretofore required for updating accounts, posting sales, etc. Many banking institutions employ magnetically encoded documents to assist in the preparation of customers' accounts. In addition, petroleum companies and department stores may utilize encoded documents which are readable by optical means. The encoded characters, whether encoded for optical means or for magnetic reading systems, are positioned upon documents such as checks, invoices, etc. and the sorting routine of the particular document is determined by the character or characters so encoded. Although the present invention relates primarily to a magnetic ink character recognition (MICR) system, it is equally applicable to an optical reading system.

In character reading systems of the prior art, if the character reading device scans a character and determines that it is a valid character, the document is sorted according to the routine so indicated by the particular character. In the event that the reading device is not able to read and identify a particular character or no character is present to be read in the location desired, then the document is placed in the reject hopper. The documents in the reject hopper are then sorted by manual means. If it is desired by the operator to determine why the rejected documents were not read, a manual inspection of these documents may reveal that the character was missing or that the character was unreadable due to low magnetic ink intensity, poorly formed character, or for many other reasons. Although the manual operation does reveal to some degree the reason for the misread operation, it is a case of the operator determining by inspection the reason why the reading and sorting device did not respond properly. The present invention proposes that the machine itself indicate on a plurality of conductors whether the character was a valid character, whether it was an unreadable character or whether the device encountered a missing character. Thus, the device itself indicates which type of character was encountered.

Due to timing considerations of the sorting system and reading device, the spacing between characters, and the general formation of the characters themselves, misreading of a character may occur under the following conditions: a valid character follows a plurality of unreadable characters; a valid character follows a plurality of missing characters; if the first character in a field is unreadable, then it may be read as a missing character; a valid character of low iron density (magnetic) or low light reflectivity (optical) may be read as a missing character or as an unreadable character; a character with a pitted or feathered vertical first leading edge may be misread since the reject signal may arrive before the signal indicating that a character was encountered; an unreadable character may be indicated if there is a greater spacing between characters than that allowable; and, missing characters may be read as unreadable characters or vice versa.

Accordingly, it is the principal object of the present invention to improve character indicating circuits.

It is a further object of the present invention to improve character indicating circuits which indicate the type of character encountered.

It is a further object of the present invention to provide means for indicating when a character reading device encounters an unreadable character.

It is a still further object of the present invention to provide means for indicating when the character reading system encounters a missing character in a field of characters.

Other objects of the invention will be pointed out in the following description and claims and illustrated in the accompanying drawings, which disclose, by way of example, the principle of the invention and the best mode which has been contemplated, of applying that principle.

To obtain an unreadable character indication or a missing character indication, the circuit of the present invention generates the following signals: a signal indicating that a valid character has been read and identified; a blanking signal which occurs as soon as a valid character has been read and identified; a reject signal which is generated upon the detection of an unreadable character or the encountering of a missing character; and, a coarse timing signal which indicates that some ink, whether readable or not, was encountered at the desired reading location upon the document. In addition, a plurality of other signals including inhibit signals, enable signals, etc. are generated which are necessary for the operation of the circuit.

A document containing a field of encoded characters, usually of a specific format but readable with the human eye, is passed before a reading head which produces an output characteristic to the particular character scanned. The characteristic signal is delivered to a delay line whose outputs are directed to a character recognition matrix which searches to identify the characteristic signal with one of the "stored" signals within the matrix. If a valid character has been scanned and identified it is so indicated on individual output lines. If, however, a missing character is encountered, a reject signal is generated which strobes a plurality of gates and will cause an output from the missing character gate. If an unreadable character is encountered, then the coarse timing signal, the $\overline{\text{reject}}$ signal and the $\overline{\text{blanking}}$ signal are combined to set a bistable device such as a flip-flop. Subsequently, the reject signal is available to strobe the gates and an output will be indicated from the unreadable character indicator associated with that gate. Later, the bistable device is reset at the appropriate time.

Reference is now made to the accompanying drawings which show a preferred form of the invention and on which reference characters designate like parts referred to in the following description.

In the drawings:

FIGURE 1*a* is an electrical schematic view of a portion of the character recognition system;

FIGURE 1*b*, when placed side by side with FIGURE 1*a*, completes the schematic view of the character recognition system;

Figure 1A:
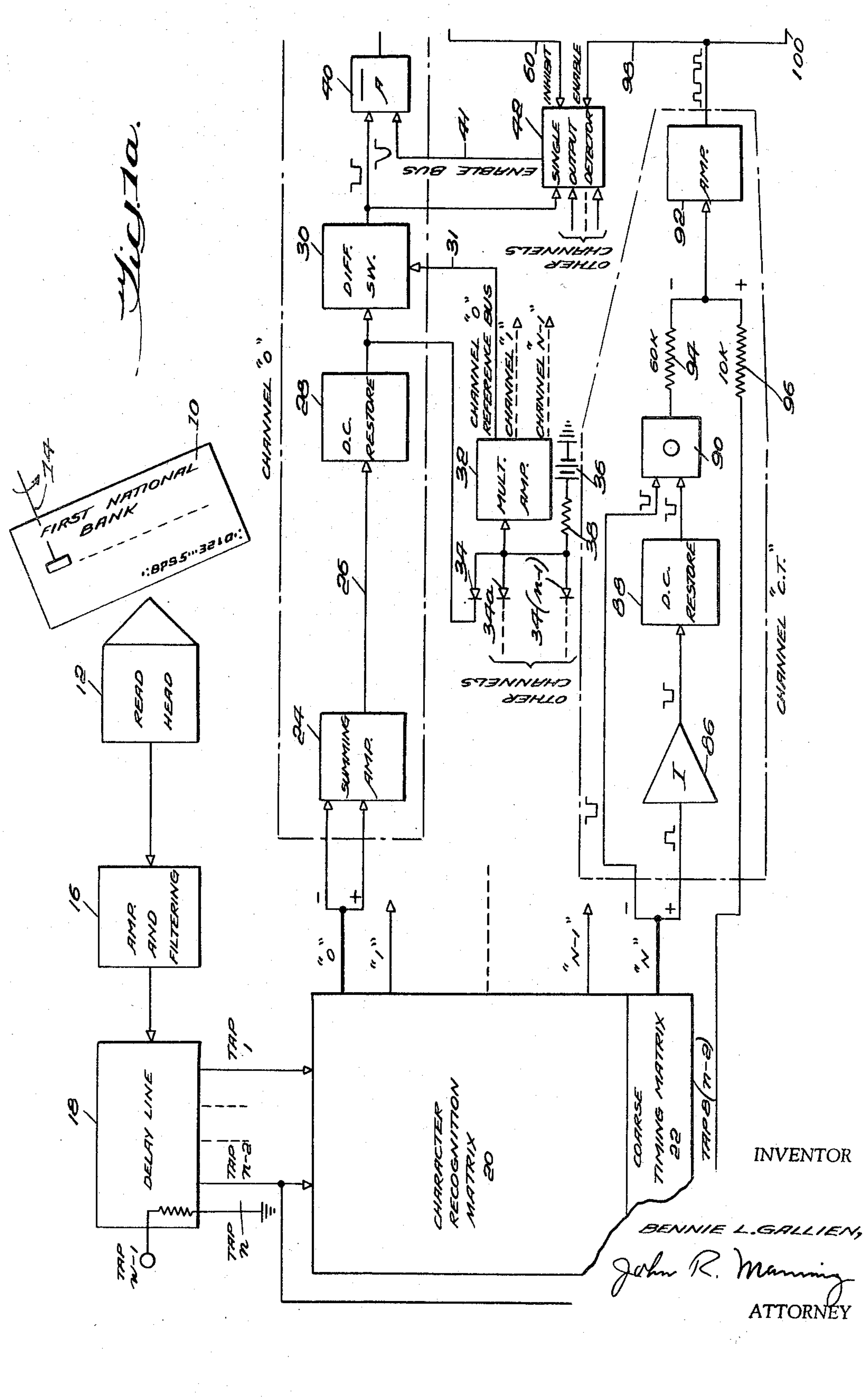

For a detailed description of operation to afford an understanding of the invention, reference will now be had to the drawings. On the FIGURE 1*a*, a document 10, having magnetically encoded characters along its lower edge, is passed in front of a read head 12 by the means 14. The means 14 are shown only schematically since the advancing means 14 may be any arrangement of belts, pulleys, etc. to accomplish the substantially uniform passage of the document 10 past the read head 12. The output from the read head 12 is applied to the amplifier and filtering circuits 16. The amplifier portion of the block 16 will amplify the variable signal level from the read head 12 and the filtering section of the block 16 will remove much of the background noise generated from the read head 12 as a result of passing the magnetically encoded characters thereby. The amplified and filtered output from the block 16 is then applied to a delay line 18 having a plurality of output taps uniformly positioned in time to sample the output wave from the read head 12 at the desired instant of time. The delay line 18 may be of any of the well known types which can delay an entire signal and yet substantially preserve its wave shape. For example, a suitable delay line is the artificial transmission line described on pages 353 et seq. of High Speed Computing Devices, by Engineering Research Associates, Inc. and published by the McGraw-Hill Book Company. Another delay line apparatus is a magnetic drum or endless magnetic tape loop. The delay line has a time delay sufficient to enable the entire signal to be contained therein. At a number of sampling points along the delay line 18, the amplitude of the signal contained therein is detected. Suitable sampling points and wave shapes derived thereon may be such as those shown in copending application Serial No. 114,784, entitled "Null Dependent Symbol Recognition," filed June 5, 1961, now Patent No. 3,212,058, and assigned to the same assignee as the present invention. In addition, a more complete description of these and other elements shown in the FIGURES 1*a* and 1*b* may be obtained by reference to the aforementioned application.

The outputs on the various taps from the delay line 18 are applied to a character recognition matrix 20 such as the type shown in the aforementioned copending application. In addition, the character recognition matrix 20 includes a coarse timing matrix 22 which generates an output signal indicative of whether ink was present at the particular area of the document 10 under observation.

The plus and minus outputs on the "zero" conductors from the character recognition matrix 20 are directed to the channel "zero." Similarly, the plus and minus conductors from each of the other matrices of the matrix 20 are directed to other channels (not shown), one channel for each character to be identified. In addition, the plus and minus conductors from the coarse timing matrix 22 are directed to the channel C.T. (coarse timing) via the conductor N.

The positive and negative output lines of the "0" conductor from the character recognition matrix 20 are connected to respective positive and negative inputs of a summing amplifier 24. The input impedances to amplifier 24 are very low whereas the source impedances for the non-recognition signals present on the "0" conductor are comparatively high. One of the input signals in the summing amplifier 24 is inverted in the amplifier 24 and then added to the other input signal and amplified. Thus, output signals proportional to the sum of the magnitudes of the input signals irrespective of their signs are developed at the output of the summing amplifier 24 and directed via the conductor 26 to a D.C. restoring circuit 28. Each such output signal on the conductor 26 represents the degree to which each of the waveforms effectively built into the matrices of the character recognition matrix 20 conforms to the waveform from the delay line 18 at any given time. Thus, a waveform which conforms closely to one of the stored waveforms of the matrices may be identified by the resulting low output from one of the summing amplifiers 24 of the various channels.

A desired D.C. level is applied to the signal by the circuit 28 and applied to a differential switch 30. The switch 30 permits a signal applied at one of its inputs to be passed or not passed by the circuit depending on the voltage applied to its second or control input from a multiplying amplifier 32. From each of the D.C. restoring circuits 28 (only one of which is shown) there is taken an output to the amplifier 32 via a diode 34. The other channels, not shown, have outputs from their restoring circuits coupled to the diodes 34*a* . . . through 34(*n*-1). A source of potential 36 is coupled to the input (and the anodes of the diodes 34, 34*a* and 34(*n*-1)) through a resistor 38. The positive side of the source of potential 36 is connected to the anodes of the diodes. The negative terminal of the source of potential 36 is connected to ground. The voltages on the output channels of the restoring circuits 28 are positive with respect to ground. The source of potential 36 effectively biases the diodes 34 so that the output voltage appearing across the resistor 38 and applied to the multiplying amplifier 32 corresponds in magnitude to the lowest of the voltages appearing at the outputs from the restoring circuits 28.

The amplifier 32 effectively multiplies the voltage output of the diodes by a constant factor. Adjustment of the multiplying factor of the voltage output from the diodes permits control over the error-reject ratio. The multiplied output from the diodes is applied from the amplifier 32 to each of the differential switching amplifiers 30, only one of which is shown. The channel "zero" reference bus 31 is directed to the differential switch 30 whereas the remaining channel reference buses would be directed to corresponding differential switches in their respective channels. A differential switch suitable for use in the channels is more fully described and shown in the aforementioned copending application.

The output (a negative going substantially square wave) from the switch 30 is directed to a negative AND 40 and to a single output detector 42. The single output detector 42 receives outputs from corresponding switches of the other channels (not shown) and an inhibit signal on the conductor 60. The inhibit signals will be discussed subsequently. In addition, enable signals are available to the detector 42 on the conductor 98. The coincidence of a single input from a switch 30 and an enable signal on the conductor 98 produces an output on the enable bus 41.

An output from the negative AND gate 40 to an integrator 46 is obtained if the following conditions exist: The switch 30 presents a negative pulse to the gate; no other channels are applying signals to the single output detector 42 to indicate that a multiple read has occurred; an enable signal on the conductor 98 is present; and, no inhibit signal on the conductor 60 is being applied to the detector 42. If these conditions are present, the integrator 46 will integrate the output signal from the AND 40 and apply the integrated signal to a character OSMV (one shot multivibrator) 48 which has a period of, for example, 70 microseconds. The output from the OSMV 48 is directed to one of the inputs of a negative AND circuit 50. In addition, the OSMV 48 directs its output to a blanking OSMV 52 through a diode 54. Thus, the blanking OSMV 52, having for example, a period of 310 microseconds, will cause blanking if a valid character has been read. A blanking signal is derived when the signal in the delay line 18 has arrived at tap 8 and a valid character has been recognized. The blanking signal prevents reading again when other portions of a valid character advance through the delay line 18 and reach tap 8. The blanking signal is applied from the blanking OSMV 52 through an emitter follower circuit 56 to the blanking output conductor 58. In addition, an output from the emitter follower 56 is directed via the conductor 60 to the single output detector 42 which now prevents the enable bus 41 from further indicating an output.

In addition to the signal applied to the blanking conductor 58 from the blanking OSMV 52, the signal is also applied to a delay OSMV 62 which, for example, has a period of 33 microseconds. The output from the delay OSMV 62 indicates character presence and after being inverted by an inverter 64 is applied to a read OSMV 66 and as a sync pulse to a missing character generator 68. The missing character generator 68 runs constantly with character speed and is an asynchronous multivibrator having a pulse period (producing an output pulse) at least once every 450 microseconds. The output from the generator 68 is directed to the AND gate 70. In addition, the gate 70 may be inhibited by an output from the blanking OSMV 52 on a conductor 72. The timing at the gate 70 is such that if a valid character has been identified, no reject signal is required and the gate 70 produces no output. However, in the event that an unreadable character or a missing character were encountered, then the gate 70 produces an output to a reject OSMV 74 having a period, for example of 25 microseconds. The output from the reject OSMV 74 is inverted at 76 and appears on the reject output conductor 78.

The output of the read OSMV 66 is inverted by the circuit 80 and is directed to all the channels on the read bus conductor 82 to the AND 50 of each channel, only one of which is shown. The timing is such, as noted from a subsequent reference to the timing diagram of the FIGURE 3, that if a valid character has been read, then both inputs are available to the AND 50 and a valid character indication is given on the valid character "0" conductor 84. In other words, the character OSMV 48 presents a signal to the AND 50 for a period of 70 microseconds. The leading edge of the output from the character OSMV 48 also triggers the blanking OSMV 52 whose leading edge also triggers the delay OSMV 62. The trailing edge of the delay OSMV 62 will trigger the read OSMV 66 and for 25 microseconds present a read bus signal on the conductor 82 back to the AND 50. Thus, during the 70 microseconds that the character OSMV 48 is on, a signal will traverse the loop and will arrive on the conductor 82 to provide coincidence of inputs to the AND 50. Since a valid character has been identified, the blanking OSMV 52 will inhibit the AND 70 via the conductor 72 and prevent the generation of a reject signal on the conductor 78.

As shown in the FIGURE 1*a*, the coarse timing matrix 22 receives the outputs on the respective taps 1 through *n*-2 from the delay line 18. The coarse timing matrix 22 will generate an output whenever ink is encountered on the document being read. The coarse timing signal provides a means of establishing in a time relationship when ink appears on the document 10 in the particular location passing under the read head 12. Provision is made in the coarse timing channel to generate an output only when the signal is of a predetermined magnitude in relation to the signal at other points in the delay line 18.

The minus and plus conductors on the N bus from the coarse timing matrix 22 are directed to the channel C.T. (coarse timing) as shown. The positive portion of the signal is inverted by an inverter 86, a D.C. level is restored by the circuit 88, and applied to the OR circuit 90. The negative bearing conductor from the matrix 22 is supplied directly to the OR circuit 90. Thus, both signals appearing at the OR circuit 90 are negative. The output from the OR circuit 90 is coupled directly to an amplifier 92 through an approximately 60,000-ohm resistor 94. In addition, the tap *n*-2 (in the actual embodiment tap 8) is coupled to the amplifier 92 through the 10,000-ohm resistor 96. It will be noted that the impedance relationship between the resistors 94 and 96 is approximately 6 to 1.

As noted earlier, the coarse timing from the tap *n*-2 will be utilized only when the signal at one of the taps 1 through *n*-3 is greater than approximately 1/6 that at tap 8 (tap *n*-2). Since a signal applied to a delay line will cause a ripple to occur at subsequent taps, the ripple which is generated must be distinguished from an actual signal generated as a result of the read head 12 producing a varying flux due to magnetic ink upon the document. Accordingly, the circuit within the channel C.T. provides such a means for distinguishing between ripple signals and actual signals generated as a result of reading a character. In other words, if the outputs at all of the taps 1 through *n*-3 are less than 1/6 of that signal appearing at tap *n*-2, then the net result is that the signal is determined a ripple signal and not utilized to generate a coarse timing signal. If, however, the output from one of the taps 1 through tap *n*-3 is greater than 1/6 the value of the signal appearing at the tap *n*-2, then the signal is determined to be one derived as a result of reading a character on a document and a coarse timing signal is generated. The resistor arrangement 94 and 96 provides such a means of determining whether the required voltage magnitudes have been reached to generate a coarse timing output signal. For example, if the voltage at tap *n*-2 is 6 volts and the greatest voltage at any of the other taps is 2 volts, then a coarse timing signal will be generated. As a second example, if the voltage at tap *n*-2 is 6 volts and the greatest voltage at any of the other taps is one-half a volt, then no coarse timing output signal is generated since the 1/6 requirement has not been met.

The output from the amplifier 92 is directed as an enable signal on the conductor 98 to the signal output detector 42. A signal on the conductor 98 will indicate that a character has been read and will permit the enable bus 41 from the single output detector 42 to generate an output signal if certain other conditions have been met as previously set forth.

Figure 1B:
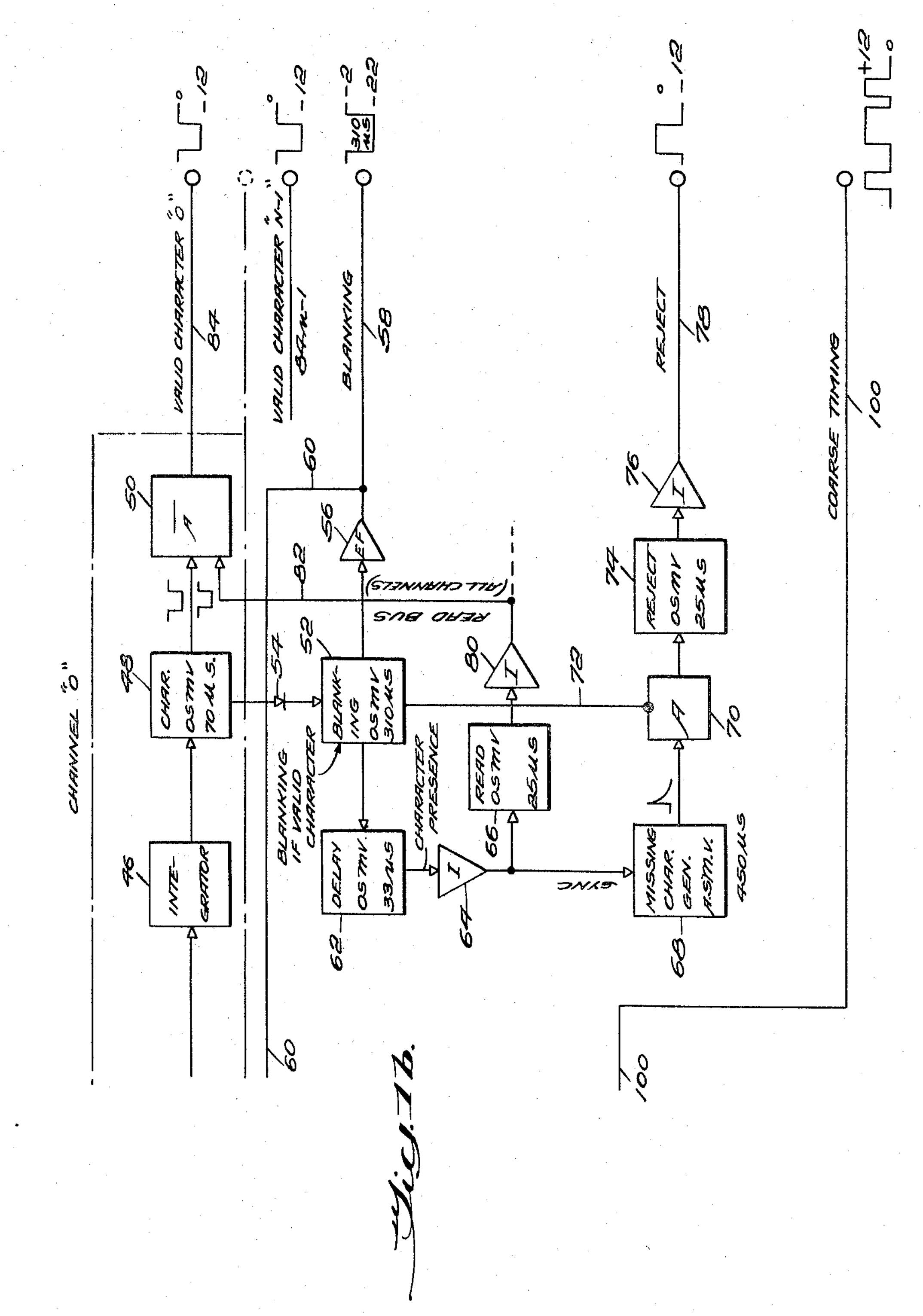

In addition, the signal from the amplifier 92 is directed to provide a coarse timing signal on the conductor 100 as shown, FIGURE 1*b*.

Figure 2:
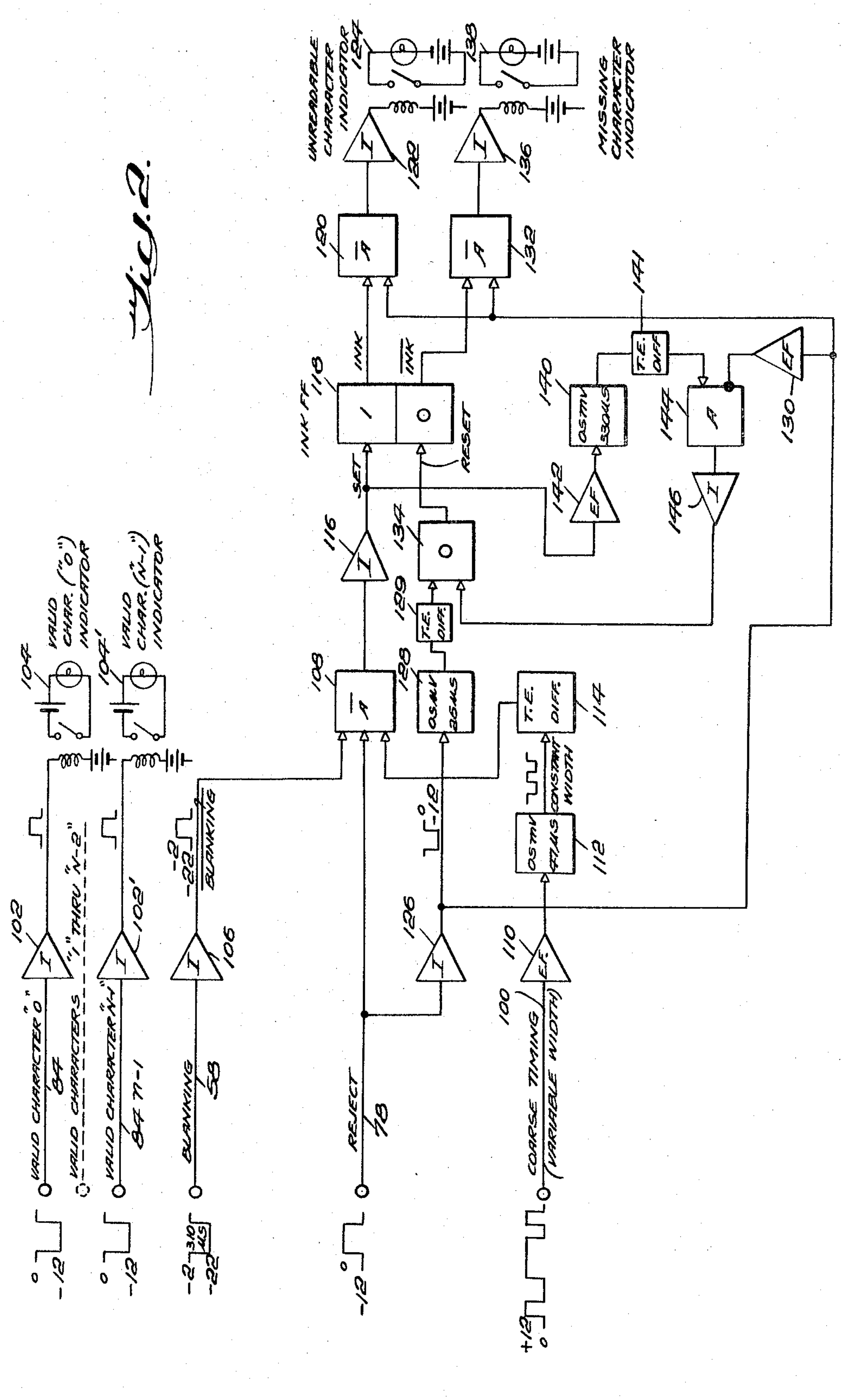
FIGURE 2 is a schematic view of the character indicating circuit of the present invention.

The circuit of FIGURE 2 provides an indication of whether a valid character was read, an unreadable character was read, or a missing character was encountered. The valid character lines 84 through 84 *n*-1 are coupled respectively to the inverters 102 and 102′. The output of the inverters 102 and 102′ are coupled, respectively, to the indicator circuits 104 and 104′. Each of the indicator circuits may comprise a relay and visual arrangement as shown, an audible signal, or means may be employed on these valid character output conductors to count the number of valid characters encountered.

The blanking signal on the conductor 58 is inverted by the circuit 106 and applied to the negative AND circuit 108. A second input to the $\overline{\text{AND}}$ 108 is from the coarse timing conductor 100. However, before application to the $\overline{\text{AND}}$ 108, the coarse timing signal is applied to an emitter follower 110, an OSMV 112 having a period, for example, of 47 microseconds which produces a constant width inverted pulse to a trailing edge differentiator 114. It is the output from the trailing edge differentiator 114 that is applied as an input to the negative AND gate 108. It will be noted that the OSMV 112 inverts the signal so that each positive-going coarse timing signal on the conductor 100 provides a sharply falling (negative-going) signal to the $\overline{\text{AND}}$ 108.

The $\overline{\text{AND}}$ circuit 108 provides an output if the following conditions are met: no blanking is present (blanking infers a valid character) so that the signal level from the inverter 106 to the input of the $\overline{\text{AND}}$ 108 is low, approximately minus 22 volts; the reject signal does not appear so that this input would be approximately −12 volts; and, coarse timing is available as a negative input to the $\overline{\text{AND}}$ 108. Coarse timing indicates that ink was present on the document so that there is either a valid character or an unreadable character and not a missing character.

The output from the $\overline{\text{AND}}$ 108 is coupled to an inverter 116 whose output is directed to set the ink flip-flop 118. If ink is available on a document, the ink flip-flop 118 is driven to its set or "one" condition. If no ink is at the particular area on the document or not enough ink to cause a useable signal, then the ink flip-flop 118 remains in its reset or "zero" condition. The output from the "one" side of the ink flip-flop 118 is applied to a negative AND 120. The output from the $\overline{\text{AND}}$ 120 is coupled to an inverter 122 whose output is directed to an unreadable character indicator 124 comprising, for example, a relay, a visible indicator, and potential sources. In addition, the unreadable character indicator 124 may include an audible alarm and means for counting the number of unreadable characters encountered.

The signal on the reject conductor 78 is inverted by the inverter 126 and applied to an OSMV 128 (having, for example, a period of approximately 25 microseconds), an emitter follower 130, the negative AND 120, and a negative AND 132. In addition, the signal from the OSMV 128 is differentiated by a trailing edge differentiator 129 and the trailing edge applied to an OR circuit 134 whose output will reset the flip-flop 118. The output from the inverter 126 to the $\overline{\text{ANDS}}$ 120 and 132 is utilized to strobe these gates and provide an output from either of the gates according to the condition of the flip-flop 118. The output from the $\overline{\text{AND}}$ 132 is coupled to an inverter 136 whose output is directed to a missing character indicator 138 which may comprise a relay, a light source and suitable batteries. In addition, the missing character indicator 138 may be an audible alarm and include means for recording the number of missing characters that were encountered.

Normally, the reject signal on the conductor 78 will reset the flip-flop 118 at the approximate time; however, under certain conditions of missing characters following unreadable characters or following valid characters and other combinations of these conditions, the reject signal may not be available to reset the flip-flop 118. Under these conditions, the flip-flop 118 is reset from its set side in the following manner. An output from the inverter 116 is directed to an OSMV 140 through an emitter follower 142. The output of the OSMV 140, which may have a period of 330 microseconds, is differentiated by the trailing edge differentiator 141 and the trailing edge applied to an inhibit AND 144 whose output is inverted by the circuit 146 and directed to the reset side of the flip-flop 118 through the OR circuit 134. When the reject signal appears, assuming the flip-flop 118 is in its set side, the reject pulse will strobe the gates $\overline{120}$ and $\overline{132}$ and be applied to the OSMV 128 which will reset the flip-flop 118, 25 microseconds later. The signal from the inverter 116 to the OSMV 140 will be inhibited at the AND 144 whenever a reject pulse is present since the signal from the OSMV 140 is not required to reset the flip-flop 118 as the reset will be accomplished by the trailing edge of the pulse generated by the OSMV 128 which had already been triggered. In other words, the real function of the reject inhibit at the gate 144 is to prevent the ink flip-flop 118 from being reset by the OSMV 140 during a reject pulse period. If this occurred, the unreadable character output could be reduced to just a "sliver" pulse.

For a detailed description of operation, reference will now be had to the figures. It is initially assumed that the device is in cycle 1, performing the reading and recognition of a valid "0" (see the waveform of the FIGURE 3). As shown in the FIGURE 1*a*, a document 10 is propelled past the read head 12 by the means 14. After amplification and filtering by the device 16, the signal is applied to a delay line 18. The outputs from the delay line 18 are applied to the character recognition matrix 20 whose outputs are directed to a plurality of channels on the "zero," "one" . . . "N-1" and the "N" conductors. For a more detailed description of the operation of the schematic of the FIGURES 1*a* and 1*b*, reference may be had to the aforementioned application.

For the purposes of explanation, assume that digit "0" has been passed beneath the read head 12 (cycle 1) and its characteristic output signal has been applied to the delay line 18. As shown in the FIGURE 3, the waveform at tap 8 for the "0" will be as indicated. Since a "0" has been read and identified, minimum signals will appear on the minus and plus conductors and be directed to channel "zero" to the summing amplifier 24. The summing amplifier 24 will add the two signals regardless of their polarity and apply its output to a D.C. restore circuit 28 via the conductor 26. The output from the D.C. restore circuit 28 is applied to a differential switch 30 and to an amplifier 32 through the diode 34. From the reference to FIGURE 1*a*, it will be noted that all the other channels apply outputs from their respective D.C. restore circuits (not shown) through their respective diodes to the multiply amplifier 32. As previously set forth, the potential supplied by the source 36 will cause that channel having the lowest output to produce a signal on the channel "zero" reference bus 31 back to the differential switch 30. Since the digit "0" has been read and identified, the signal to the amplifier 32 from the D.C. restore circuit 28 is the circuit producing the minimum output which now causes the signal as shown in the FIGURE 3 on the reference bus 31 to be applied to the differential switch 30. It will be noted that since valid identification has been accomplished, there is the point 150 of the waveform of the reference bus 31 which reaches its reference level, as shown at the broken line.

As shown in the FIGURE 1*a*, the output from the differential switch 30 is applied to the AND circuit 40 and to the single output detector 42. It will be noted that all other channels are also applying outputs to the single output detector 42. The purpose of the detector 42 is to ascertain that only a single identification has been accomplished by the reading and identifying system. In addition, an enable signal on the conductor 98 from the coarse timing channel, to be subsequently described, will cause an output on the enable bus 41 back to the AND circuit 40. The output of the enable bus 41 is shown on the FIGURE 3. A pulse of approximately 7.5 microseconds duration from the detector 42 over the enable bus 41 will strobe the AND 40 whose output is integrated by the circuit 46 and applied to the character OSMV 48.

Figure 3:
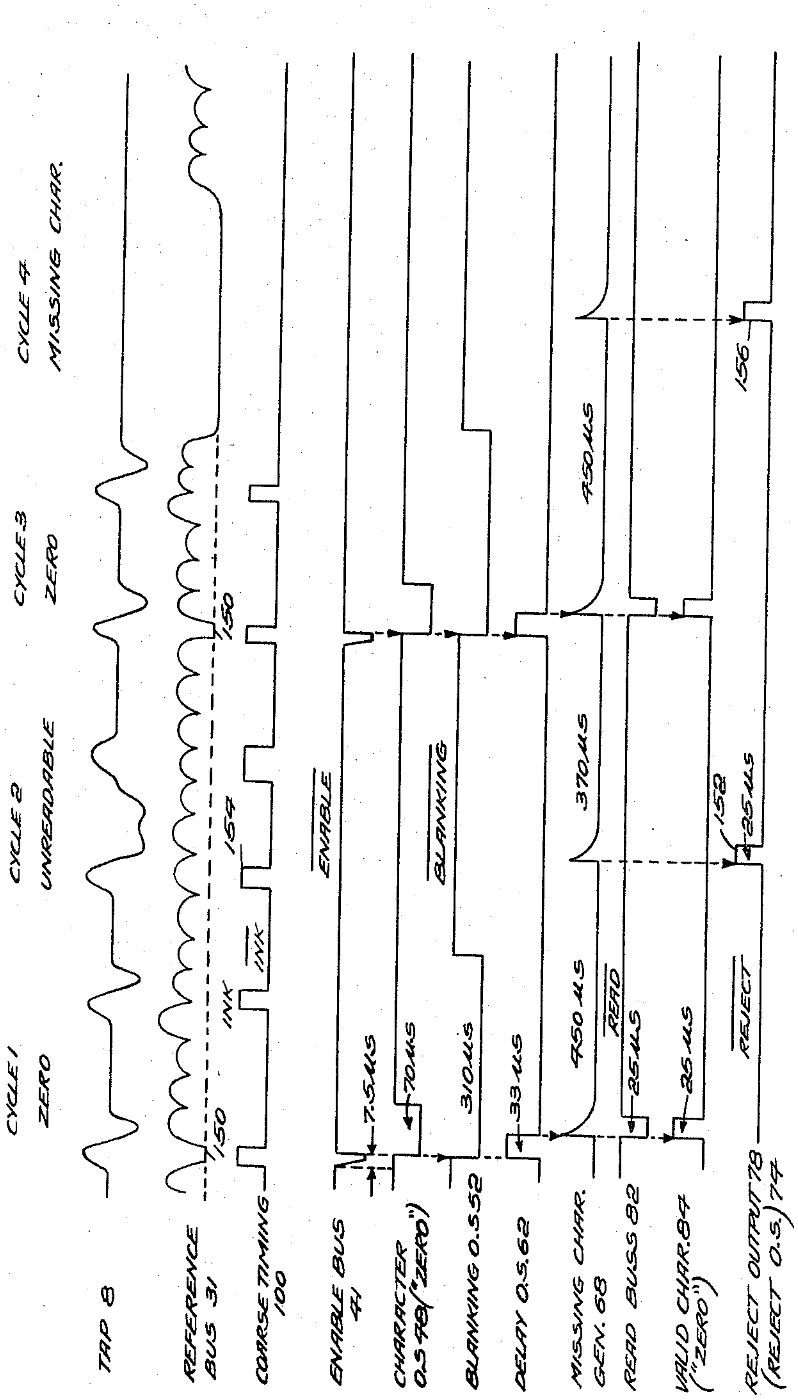
FIGURE 3 is a timing diagram of the signals generated in the FIGURES 1*a*, 1*b* and 2; and, FIGURE 4 is a timing diagram of signals of the auxiliary resetting loop for the ink flip-flop.

While the foregoing is occurring, the coarse timing matrix 22 of the FIGURE 1*a* has produced an output over the channel C.T. (the coarse timing channel) since ink was present on the document 10 in the area under observation. This output from the OR circuit 90 and the tap 8 to the resistors 94 and 96, respectively, was examined for validity by causing the amplifier 92 to produce an output, as shown, only if the output from the OR circuit 90 was at least one-sixth or greater in magnitude as that from the tap 8 to the resistor 96. As discussed previously, the taps 1 through 7 (tap *n*-3) are examined to insure that these taps produce a signal at least one-sixth the value of that produced at tap 8. If none of the taps 1 through 7 produce an output having the required magnitude, then the output at tap 8 is possibly a reflection in the delay line and a valid character identification has not yet occurred. The coarse timing signal 100, which is shown in the FIGURE 3, is applied on the enable conductor 98 to the single output detector 42 and also on the conductor 100 to the FIGURE 2. It will be noted that the coarse timing signal 100 is not uniform in repetition rate or duration since this signal is just as the name implies, a coarse timing signal, which is derived from the presence of ink (magnetic ink in the example set forth) on the document in the area under observation.

The signal thus far has been applied to the character OSMV 48 whose output of 70 microseconds is applied to the negative AND circuit 50 and through a diode 54 to the blanking OSMV 52 of the FIGURE 1*b*. The outputs of these circuits are shown in the FIGURE 3. It will be noted that the trailing edge of the pulse on the enable bus 41 triggers the character OSMV 48 of the "zero" channel for 70 microseconds, the blanking OSMV 52 for 310 microseconds, whose output then triggers the delay OSMV 62 for 33 microseconds. The output from the blanking OSMV 52 is supplied to the delay OSMV 62 whose output was just discussed, to the inhibit terminal of the AND circuit 70, and to the emitter-follower circuit 56.

The output from the delay OSMV 62, which indicates character presence, is inverted by the circuit 64 and applied to the read OSMV 66 and as a sync pulse to the missing character generator 68, which is an astable multivibrator producing a pulse at least once every 450 microseconds. The output from the read OSMV 66, which was triggered by the trailing edge of the signal from the delay OSMV 62 is inverted by the inverter 80 and applied as a read bus on the conductor 82 to the AND circuit 50. Since the pulse from the character OSMV 48 traverses the loop including the blanking OSMV 52, the delay OSMV 62, the inverter 64, the read OSMV 66, and the inverter 80, in approximately 33 microseconds (see FIGURE 3), the pulse from the character OSMV 48 having a duration of 70 microseconds, is still available to the AND circuit 50 to produce an output on the conductor 84 that a valid character (a zero) has been read and identified.

If other characters were read and identified, their outputs from the character recognition matrix 20 to their respective channels (not shown) would indicate on their respective output conductors that a valid character has been read and identified.

The output from the blanking OSMV 52 through the emitter follower 56 is applied via the conductor 60 as an inhibit signal to the single output detector 42. From the waveform for cycle 1 of the FIGURE 3 it will be noted that the most negative portion of the waveform of the blanking OSMV 52 shown in the FIGURE 3, will inhibit via the conductor 60, the single output detector 42. This is obviously necessary since a valid character has now been read and identified and the enable bus 41 must be inhibited for the remainder of the individual character reading and identifying cycle.

As noted earlier, the output from the emitter-follower 56 also appears on the conductor 58 as a blanking signal which is applied to the indicator circuit portion shown in FIGURE 2. Also, the output of the delay OSMV 62, is inverted by the circuit 64 and applied as a sync pulse to the missing character generator 68. The missing character generator 68 operates asynchronously, as shown by the waveform of the missing character generator 68 in the FIGURE 3. Its output is directed to an inhibit AND circuit 70 and the output of the AND 70 will generate the reject signal. However, since a valid character has been read and identified, the blanking OSMV 52 will inhibit the output of the AND 70 which prevents the reject OSMV 74 from causing an output on the conductor 78 during this valid character reading cycle.

As shown in the FIGURE 2, the valid character outputs of the conductors 84 through 84*n*—1 are inverted by the inverter circuits 102 and 102', respectively, and applied to the respective indicator circuits 104. The indicating circuits 104 may include a relay, as shown, which will cause actuation of the light source. In addition, means may be employed to count the number of valid characters recognized on each of the output lines.

In the next example (cycle 2), we will assume that an unreadable character has been scanned and identification of the waveform has failed. It will be noted that, from the FIGURE 3, the reference bus 31 does not reach a minimum during the reading of an unreadable character so that none of the AND circuits 40, only one of which is shown, produce outputs. Accordingly, it will be observed from the FIGURE 3 that although there was coarse timing since some ink was present on the document, the enable bus 41 remains high (not enable), the character OSMV 48 remains high indicating that a character has not been read and identified, the blanking OSMV 52 remains high which indicates that a valid character has not been read and identified (blanking is necessary and occurs when the signal is at tap 8 and prevents reading again when other portions of a valid character reach that tap), the delay OSMV 62 is not triggered, the read bus 82 is not signalling a read command, and no output from a valid character conductor is indicated. It will be noted now that since the signal from the blanking OSMV 52 is not available on the conductor 72 to inhibit the output of the AND 70, a reject output from the reject OSMV 74 to the reject conductor 78 will be generated approximately 450 microseconds after the delay OSMV 62 was triggered and returned to its quiescent state, which time corresponds to approximately the middle of the unreadable waveform shown at tap 8 of the FIGURE 3. However, prior to the generation of the reject pulse, which will hereinafter be referred to, the conditions are such that an unreadable character will be indicated.

Assuming that the ink flip-flop 118 has been reset by a previous reject pulse or by a set pulse through the loop including OSMV 140, the AND 144, and the OR 134, the conditions now will cause the negative AND 108 to generate an output. The $\overline{\text{AND}}$ 108 will cause an output if all the inputs to the $\overline{\text{AND}}$ 108 are negative. Thus, since the circuitry of FIGURES 1*a* and 1*b* are indicating an unreadable character, the blanking signal 58 has been inverted by the inverter circuit 106 and presents its most negative input to the AND 108; the reject pulse 152 shown on the FIGURE 3 has not yet been generated so that its most negative output is applied to the AND 108; and, the coarse timing signal 100 has been inverted in the OSMV 112 and presents the coarse timing pulse 154. This latter pulse is shown on the FIGURE 3 as a positive pulse but, in fact, been inverted by the OSMV 112 and is applied to the $\overline{\text{AND}}$ 108 for 47 microseconds. Thus, the $\overline{\text{AND}}$ 108 generates an output to the inverter 116 which produces a positive pulse to set the flip-flop to its "one" or ink state. The flip-flop 118 will apply a negative signal of some duration to the negative AND 120. Subsequently, the missing character generator 68 will generate a pulse to the AND 70 which is not inhibited since the blanking OSMV 52 does not inhibit during cycle 2. The reject OSMV 74 is thus triggered and, after inversion by inverter 76, the output therefrom is applied to the reject conductor 78. As shown in the FIGURE 2, the reject signal 78 goes positive which inhibits the output of the $\overline{\text{AND}}$ 108 to the inverter 116 and the set input of the flip-flop 118. However, this has no effect on the flip-flop 118 as it will remain in this state until returned to the reset state at a later time. In addition, the reject signal is inverted by the inverter 126 and strobes the gates 120 and 132. Since the flip-flop is in its set state and applying a high level signal to the $\overline{\text{AND}}$ 120, the $\overline{\text{AND}}$ 120 will cause an output to the inverter 122 whose output will then be applied to the unreadable character indicator 124 to indicate that an unreadable character has been encountered. In addition, means may be employed with the unreadable character indicator 124 to count the number of unreadable characters encountered.

The reject signal from the inverter 126 also triggers the OSMV 128 and after 25 microseconds, the trailing edge differentiator 129 generates a pulse through the OR 134 to reset the flip-flop 118.

Additional means are employed which will reset the flip-flop 118 under certain conditions. These means are the resetting loop comprising the emitter-follower 142, the OSMV 140, the trailing edge differentiator 141, the inhibit AND 144, the inverter 146, and the OR circuit 134. In the case of reading an unreadable character, a second coarse timing signal may be available, which along with no reject signal and no blanking, will set the flip-flop 118 back to its "one" state through the $\overline{\text{AND}}$ 108. Since no more reject pulses are generated during the cycle, the flip-flop 118 would then erroneously remain in its set condition during the next succeeding cycle if the resetting loop just described were not provided.

Figure 4:
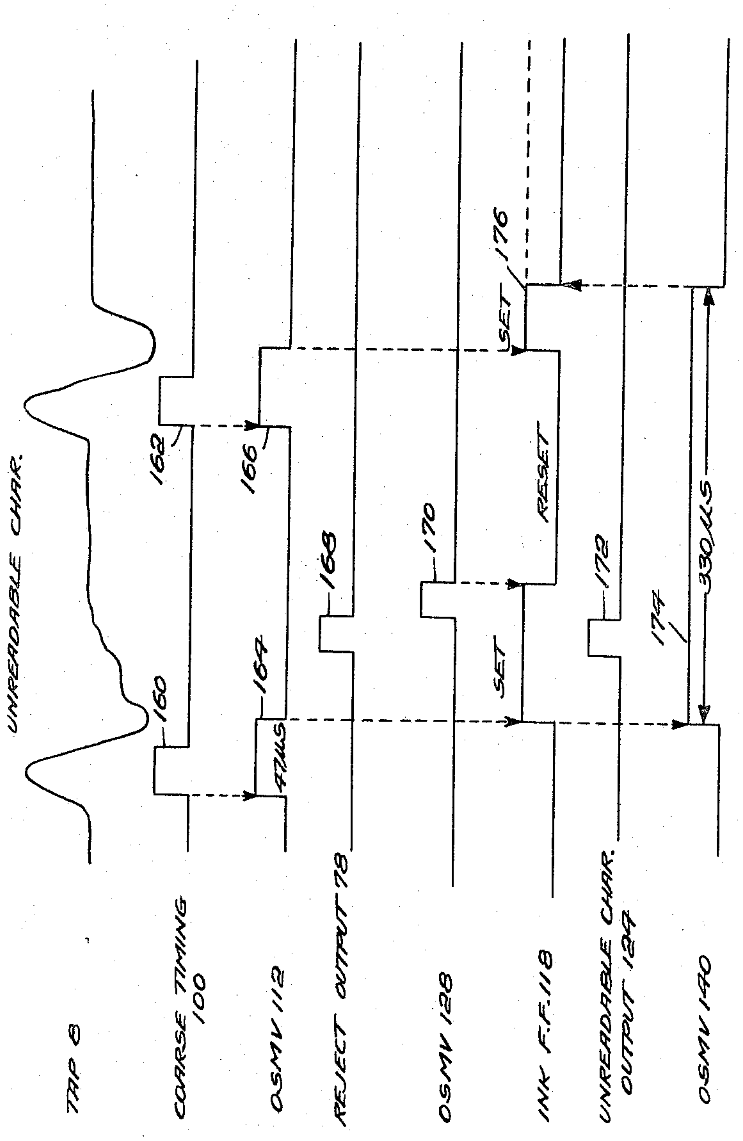

With reference to the FIGURE 4, a typical unreadable signal would be that shown at TAP 8. It is observed that a coarse timing signal 160 is generated at one portion of the unreadable signal while a second coarse timing signal 162 is generated at another portion of the signal. The OSMV 112, being directly coupled to receive the coarse timing pulses through the emitter-follower 110 of the FIGURE 2, generates outputs 164 and 166 (FIGURE 4), which, through the $\overline{\text{AND}}$ 108, sets the flip-flop 118. After the pulse 164, the reject pulse 168 is generated which triggers a pulse 170 from the OSMV 128. The trailing edge of the pulse 170 then resets the INK flip-flop 118 as shown on the FIGURE 4. An unreadable character output pulse 172 is then generated. In addition, the OSMV 140 is triggered from the pulse 164, as shown, by the 330 μs. pulse 174. As shown on the FIGURE 2, the reject pulse 168 of the FIGURE 4, inhibits the AND 144 so that the loop through the AND 144 will not reset the flip-flop 118 and perhaps cause the unreadable output pulse to be just a "sliver" pulse.

It will be noted that the coarse timing pulse 162 of the FIGURE 4, through the OSMV 112 pulse 166, again sets the flip-flop 118 as shown by the set state 176. No reject pulse is now available (only one reject pulse is generated per missing or unreadable character cycle) to reset the flip-flop 118. The resetting loop through the OSMV 140, and 144, etc. now provides a means for resetting the flip-flop 118. This means is from the inverter 116, to the OSMV 140 via emitter-follower 142, through the trailing edge differentiator 141 to the AND 144. The AND 144 is not now inhibited since no additional reject pulses are available during the cycle to cause an inhibit function. The pulse from the AND 144 is inverted at 146 and buffered through the OR 134 to the reset terminal of the flip-flop 118.

As shown in the FIGURE 3, during cycle three, the example shows that a zero was read and identified and the signal generation is substantially the same as that set forth during the reading of a "zero" during cycle one.

During cycle four, as shown on the FIGURE 3, a missing character has been encountered upon the document 10. The signal generation is substantially the same as that for an unreadable character (cycle 2) except that the reference bus remains at its minimum and no coarse timing pulses 100 are generated since no ink is present at the area under observation on the document 10. The reference bus 31 may cause an output from the differential switch 30 of the FIGURE 1*a*; however, the $\overline{\text{AND}}$ 40 will not generate an output since no coarse timing signals on the conductor 98 are available to enable the single output detector 42. Since no coarse timing signal 100 is available, the $\overline{\text{AND}}$ 108 will not produce an output since the input supplied by the conductor 100 remains at its most positive (after inversion by the OSMV 112) potential. As a result, the flip-flop 118 remains on its reset side which supplies a signal to the $\overline{\text{AND}}$ 132. As shown on the FIGURE 3, a reject pulse 156 is generated by the missing character generator 68 and this pulse, after inversion by the circuit 126, will strobe the gates 120 and 132. Since the gate 132 has its other input available to it from the flip-flop 118, the reject pulse to the gate 132 causes an output to the inverter 136. After inversion by the circuit 136, the missing character indicator 138 is actuated, thus indicating that a missing character (cycle 4) was encounted upon the area of the document 10 under observation. In addition, means may be employed to count the number of missing characters encountered by the missing character indicator 138.

Thus, there has been described a character recognition system for scanning characters positioned upon character bearing documents. After amplification and filtering, the characteristic signal is applied to a delay line whose output is directed to a recognition matrix which contains a plurality of "stored" waveforms. The matrix will indicate a valid output if the input signal meets the signal criterion for establishing a valid output. The signal criterion may not be met for one or more reasons: the character was poorly formed, smeared, etc. which resulted in an unreadable character (or signal); or, the character was missing. Each condition (valid character, unreadable character or missing character) generates unique signals and circuitry is provided to receive these signals for indicating the condition encountered.

There has been described a plurality of cycles of the device some of which indicated the reading and identification of valid characters (cycles 1 and 3), one of which indicated the occurrence of an unreadable character (cycle 2) and one of which indicated a missing character (cycle 4). As shown in the figures and more specifically on the schematic of the FIGURE 2 and the timing diagram of FIGURE 3, a valid indicator 104 is actuated at the reading and identification of a valid character. During these cycles, a blanking signal is available which inhibits the output of the negative AND 108 and a reject signal is not generated to strobe the output gates 120 and 132. If an unreadable character is encountered by the device, then the inputs to the $\overline{\text{AND}}$ 108 are such that the flip-flop 118 is set and subsequently a reject pulse is available to strobe the gate 120 and cause the indication of an unreadable character at the indicator 124. If a missing character is encountered, then the output of the $\overline{\text{AND}}$ 108 is inhibited and the flip-flop 118 remains on its reset or zero side. The reject pulse 78 is subsequently generated and strobes the gate 132 to cause an output of that gate to actuate the missing character indicator 138.

The present invention may be embodied in other specific forms without departing from the spirit and essential characteristics of the invention. The present embodiment is, therefore, to be considered in all respects as illustrative and the scope of the invention being indicated by the appended claims rather than by the foregoing description. All changes which come within the meaning and range of the equivalency of the claims are therefore intended to be embraced herein.

What is claimed is:

1. In a character recognition system the improvement comprising reading means for producing unique signals indicative of scanned characters, said reading means producing no output signal in the absence of a character, means for advancing character bearing documents past said reading means, means coupled to said reading means for deriving from said unique signals a plurality of signals indicative of the degree to which said unique signals conform to a plurality of known signals, circuit means coupled to receive the plurality of signals for selecting the signal having the highest degree of conformity, and sensing means coupled to said last named means for testing for the absence of a valid character signal, said sensing means comprising a gate for receiving signals indicative of the quality of a scanned character, bistable means coupled to said gate and settable thereby, a pair of gates coupled respective to the outputs of said bistable means, and means for strobing said pair of gates and resetting said bistable means.

2. In a character recognition system for reading characters positioned in fields on documents and for sensing character quality comprising first means for generating a signal indicating the presence of a valid character, second means for generating a signal indicating unreadable indicium on the document, third means controlled by said first pulse means for generating a reject signal in the absence of a valid character, means for combining the signals generated by said first, second and third means, bistable means settable by selected combinations of said signals, and means coupled to said bistable means for indicating the condition of said bistable means.

3. The combination as defined in claim 2 wherein said means for combining is a gate.

4. The combination as defined in claim 2 including means for coupling said reject signal to interrogate said means coupled to said bistable means.

5. The combination as defined in claim 4 including means for coupling said reject signal to reset said bistable means.

6. In a character recognition system for reading characters positioned in fields on documents and for indicating sub-standard character quality comprising first means for generating a signal indicating the presence of a valid character, second means for generating a signal indicating unreadable indicium on the document, third means controlled by said first means for generating a reject signal in the absence of a valid character, a gate for receiving all of said signals and capable of generating an output upon the occurrence of selected combinations of said signals, bistable means controlled by said gate, a coincidence circuit coupled to and conditioned by said bistable means, indicating means coupled to said coincidence circuit, and means for coupling said reject signal for strobing said coincidence circuit to actuate said indicating means to thereby signal an unreadable character.

7. The combination as defined in claim 6 including means for delaying said reject signal and means for coupling said delayed signal for resetting said bistable means.

8. A character recognition system comprising, a reading means for producing unique signals indicative of the characters being scanned, means coupled to said reading means for utilizing said unique signals to identify the characters being scanned, sensing means coupled to said last named means for testing for the presence or absence of a valid character signal, first gate means connected to said sensing means for receiving signals indicative of a valid character, first indicator means connected to said first gate means for indicating the scanning of a valid character, second gate means connected to said sensing means for indicating an invalid character, bistable means coupled to said second gate and settable thereby, a pair of gates coupled respectively to the outputs of said bistable means, separate indicator means connected to each of said pair of gates to indicate missing or unreadable characters respectively, and means for strobing said pair of gates and resetting said bistable means, said means for strobing being operable only in response to a signal from said sensing means indicative of the absence of a valid character.

9. In a character recognition system the improvement comprising reading means for producing unique signals indicative of scanned characters, means coupled to said reading means for deriving from said unique signals a plurality of signals indicative of the degree to which said unique signals conform to a plurality of known signals, circuit means coupled to receive the plurality of signals for selecting the signal having the highest degree of conformity, and sensing means coupled to said last named means for testing for and indicating the presence or absence of a valid character signal, and a first gate for receiving signals indicative of the quality of a scanned character, bistable means coupled to said gate and settable thereby, a pair of gates coupled respectively to the outputs of said bistable means, and means for strobing said pair of gates and resetting said bistable means.

10. The character recognition system recited in claim 9 wherein said sensing means includes, a first one shot multivibrator circuit for producing a signal when a valid character is detected, a second one shot multivibrator for producing a blanking signal in response to a signal from said first one shot multivibrator, delay means connected to one output of said second one shot multivibrator, first inverting means connected to said delay means, second gate means connected to said first one shot multivibrator output, indicator means for indicating a valid character when said second gate means is operated, a third one shot multivibrator connected to said first inverting means for producing a signal in response to a signal from said second one shot multivibrator, second inverting means connected between the output of said third one shot multivibrator and another input of said second gate means, asynchronous multivibrator means connected to said first inverting means, inhibit gate means connected to said second one shot multivibrator and said asynchronous multivibrator, and fourth one shot multivibrator means connected to the output of said inhibit gate, said fourth one shot multivibrator means connected to an input of said first gate means.

11. In a character recognition system the improvement comprising, reading means for producing unique signals indicative of scanned characters, said reading means producing no output signal in the absence of a character, means coupled to said reading means for deriving from said unique signals a plurality of signals indicative of the degree to which said unique signals conform to a plurality of known signals, circuit means coupled to receive the plurality of signals for selecting the signal having the highest degree of conformity, and sensing means coupled to said last named means for indicating the presence or absence of a valid character signal, said sensing means comprising a first one shot multivibrator circuit for producing a signal when a valid character is detected, a second one shot multivibrator for producing a blanking signal in response to a signal from said first one shot multivibrator, delay means connected to one output of said second one shot multivibrator, first gate means connected to said first one shot multivibrator output, indicator means for indicating a valid character when said first gate is operated, a third one shot multivibrator connected to said second one shot multivibrator for producing a signal in response to a signal therefrom the output of said third one shot multivibrator being connected to another input of said first gate means, asynchronous multivibrator means connected to said second one shot multivibrator, inhibit gate means connected to said second one shot multivibrator and said asynchronous multivibrator to inhibit the passage of signals from said asynchronous multivibrator when concurrent with a signal from said second one shot multivibrator, and fourth one shot multivibrator means connected to the output of said inhibit gate, second gate means for receiving signals indicative of the identifiability of a scanned character, said fourth one shot multivibrator means connected to an input of said second gate means, bistable means coupled to said second gate and settable thereby, a pair of output gates coupled respectively to the outputs of said bistable means, and means for strobing said pair of output gates and resetting said bistable means, said means for strobing being rendered operative only when said sensing means indicates the absence of a valid character signal.

12. In a character recognition system, means for selectively indicating the absence or the unidentifiability of a rejected character, said system supplying a first signal indicative of the presence of a valid, identifiable, character, a second signal indicative of the absence of such a character, and a third signal indicative of the presence of some indicium, a first one shot multivibrator for receiving said third signal to provide constant width signals, a first trailing edge differentiator for operating on the trailing edge of the signals produced by said first one shot multivibrator, gate means for receiving said first signal, said second signal, and the signal produced by said first trailing edge differentiator, first inverter means connected to the output of said gate means, bistable means having first and second inputs and first and second outputs, said first inverter means connected to said first input of said bistable means, a pair of output gates, each of said output gates having one input thereof connected to different ones of said first and second outputs of said bistable means, separate indicator means connected to the outputs of said output gates to provide signals indicating the absence or the unreadability of a character, second inverter means receiving said second signal, said second inverter means connected to further inputs of said output gates, second one shot multivibrator means connected to said second inverter means, OR gate means having an input connected to said second one shot multivibrator, said OR gate having the output thereof connected to said second input of said bistable means, inhibit AND gate means having the inhibit input connected to said second inverter means, the output of said inhibit AND gate means being connected to a further input to said OR gate means, and third one shot multivibrator means connected between the first input to said bistable means and a further input to said inhibit AND gate means.

13. In a character recognition system, means for selectively indicating the absence or the unidentifiability of a rejected character, said system supplying a first signal indicative of the presence of a valid, identifiable, character, a second signal indicative of the absence of such a character, and a third signal indicative of the presence of some indicium, a first one shot multivibrator for receiving said third signal to provide constant width signals, first gate means for receiving said first, second and third signals, bistable means having first and second inputs and first and second outputs, said first gate means connected to said first input of said bistable means, a pair of output gates, each of said output gates having one input thereof connected to different ones of said first and second outputs of said bistable means, separate indicator means connected to the outputs of each of said output gates to provide signals respectively indicating the absence or the unreadability of a character, said second signal being supplied to further inputs of said output gates, second one shot multivibrator means connected to said second inverter means, said second signal being supplied to an input of said second multivibrator, OR gate means having an input connected to the output of said second one shot multivibrator, said OR gate having the output thereof connected to said second input of said bistable means, inhibit AND gate means having the inhibit input supplied by said second signal, the output of said inhibit AND gate means being connected to a further input to said OR gate means, and third one shot multivibrator means connected between the first input to said bistable means and a further input to said inhibit AND gate means.

14. A character recognition system comprising means for detecting a character on a suitable bearing surface, amplifying and filtering means connected to said detecting means, a delay element for producing simultaneous parallel output signals in accordance with a series type signal produced by said detecting means, character recognition matrix means connected to said delay element to receive said parallel output signals, a plurality of circuit means connected to said matrix means for producing signals indicative of each character recognized, further circuit means connected to said matrix means to produce a signal immediately upon the detection of any indicium on said bearing surface regardless of the identifiability of said indicium, said last named signal providing a timing signal, control circuit means connected to said plurality of circuit means connected to said matrix means to receive signals produced thereby, said control circuit selectively producing blanking signals and reject signals alternatively, said blanking signal being produced only if an identifiable character is detected, and means for indicating detection of un unidentifiable character, said last named means comprising gate means which is enabled only in the concurrent absence of a blanking signal and the presence of a reject signal and a timing signal, bistable means having an input connected to an output of said gate means, further gate means connected to the output of said bistable means and selectively enabled by the application of said reject signal, and means for selectively resetting said bistable means by the delayed application of said reject signal or the delayed application of the signal produced when said gate is enabled.

15. A character recognition system comprising, apparatus for recognizing intelligence-bearing symbols comprising signal generating means for producing, in response to each symbol to be recognized, a signal including a unique electrical waveform characteristic of said symbol, filtering means adapted to receive electrical signals from said signal generating means, amplifying means connected to said filtering means for increasing the amplitude of the said signals, sampling means connected to said amplifying means for receiving said signals and providing simultaneously a plurality of samples from predetermined time-spaced points on said waveform, a character recognition matrix comprising a plurality of input lines, a positive voltage output line and a negative voltage output line for each character to be recognized, a summing circuit connected to each said positive and negative output line to provide output signals indicative of the sums of the magnitudes, irrespective of sign, of the voltages produced by said character recognition matrix, a symbol channel connected to each said summing circuit, each symbol channel including a switching circuit having an output and a first input and a second input, said first input being connected to the output of a summing circuit, a symbol gate having an output and a first "and" input and a second "and" input, the first said "and" input being connected to the output of said switching circuit, an integrating circuit having an output and an input which is connected to the output of said gate, an electrical pulse producing circuit having an input which is connected to the output of said integrating circuit, a diode gate having a plurality of inputs each of which is connected to the output of one of the summing circuits, an amplifying circuit connected to said diode gate and connected at its output to each said second input of each said switching circuit, a single output detector circuit connected to the output of each said switching circuit, symbol output detecting means connected to said electrical pulse producing circuit, a further circuit means connected to said matrix means to produce a signal immediately upon the detection of any indicium on said bearing surface regardless of the identifiability of said indicium, said last named signal providing a timing signal, control circuit means connected to said electrical pulse producing circuit to receive signals produced thereby, said control circuit selectively producing blanking signals and reject signals alternatively, said blanking signal being produced only if an identifiable character is detected whereby a signal is produced by said electrical pulse producing circuit, and means for indicating detection of an unidentifiable character, said last named means comprising gate means which is enabled only in the concurrent absence of a blanking signal and the presence of a reject signal and a timing signal, bistable means having an input connected to an output of said gate means, further gate means connected to the output of said bistable means and enabled selectively enabled by the application of said reject signal, and means for selectively resetting said bistable means by the delayed application of said reject signal or the delayed application of the signal produced when said gate is enabled.

16. Apparatus for recognizing symbol signals comprising signal generating means for generating electrical signals which may include a different and unique waveform for each of a plurality of symbols, waveform sampling means in circuit with said signal generating means for providing simultaneously a predetermined number of time-spaced voltages each representative of said electrical signals, a means connected to said sampling means for providing a voltage null when said voltages are representative of the magnitudes at spaced points on one said unique waveform, and sensing means coupled to said last named means for testing for and indicating the presence or absence of a valid character signal, and first gate for receiving signals indicative of the quality of a scanned character, bistable means coupled to said gate and settable thereby, a pair of gates coupled respectively to the outputs of said bistable means, and means for strobing said pair of gates and resetting said bistable means.

17. Apparatus for recognizing symbol signals comprising signal generating means for generating electrical signals which may include a different and unique waveform for each of a plurality of symbols, waveform sampling means in circuit with said signal generating means for providing simultaneously a predetermined number of time-spaced voltages each representative of said electrical signals, means connected to said sampling means for providing a voltage null when said voltages are representative of the magnitudes at spaced points on one said unique waveform, and sensing means coupled to said last named means for testing for the presence or absence of a valid character signal, first gate means connected to said sensing means for receiving signals indicative of a valid character, first indicator means connected to said first gate means for indicating the scanning of a valid character, second gate means connected to said sensing means for indicating an invalid character, bistable means coupled to said second gate and settable thereby, a pair of gates coupled respectively to the outputs of said bistable means, separate indicator means connected to each of said pair of gates to indicate missing or unreadable characters respectively, and means for strobing said pair of gates and resetting said bistable means, said means for strobing being operable only in response to a signal from said sensing means indicative of the absence of a valid character.

References Cited by the Examiner

UNITED STATES PATENTS 3,096,506 7/1963 Chao Kong Chow et al. 340—146.3
3,213,420 10/1965 Eckert ------------ 340—146.3

MAYNARD R. WILBUR, *Primary Examiner.*

MALCOLM A. MORRISON, *Examiner.*

J. S. IANDIORIO, J. E. SMITH, *Assistant Examiners.*